US007467085B2

(12) United States Patent
Obuchi et al.

(10) Patent No.: US 7,467,085 B2
(45) Date of Patent: *Dec. 16, 2008

(54) METHOD AND APPARATUS FOR LANGUAGE TRANSLATION USING REGISTERED DATABASES

(75) Inventors: Yasunari Obuchi, Kokubunji (JP); Atsuko Koizumi, Sagamihara (JP); Yoshinori Kitahara, Tachikawa (JP); Seiki Mizutani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 486 days.

This patent is subject to a terminal disclaimer.

(21) Appl. No.: 10/898,935

(22) Filed: Jul. 27, 2004

(65) Prior Publication Data

US 2004/0267538 A1  Dec. 30, 2004

Related U.S. Application Data

(63) Continuation of application No. 09/811,560, filed on Mar. 20, 2001, now Pat. No. 6,789,093.

(30) Foreign Application Priority Data

Oct. 17, 2000  (JP)  ............................. 2000-321920

(51) Int. Cl.
    *G10L 17/00* (2006.01)
(52) U.S. Cl. ............................. 704/246; 704/2; 704/9; 704/10; 704/231; 704/270
(58) Field of Classification Search .................. 704/246, 704/277, 2, 9, 10, 231, 270
    See application file for complete search history.

(56) References Cited

U.S. PATENT DOCUMENTS

| 4,984,177 | A | | 1/1991 | Rondel et al. |
| 5,295,068 | A | * | 3/1994 | Nishino et al. ................ 704/10 |
| 5,384,701 | A | | 1/1995 | Stentiford et al. |
| 5,732,216 | A | * | 3/1998 | Logan et al. ................ 709/203 |
| 5,848,389 | A | | 12/1998 | Asano et al. |
| 5,991,711 | A | | 11/1999 | Seno et al. |

(Continued)

FOREIGN PATENT DOCUMENTS

JP        07-141383        11/1993

(Continued)

*Primary Examiner*—Qi Han
(74) *Attorney, Agent, or Firm*—Reed Smith LLP; Stanley P. Fisher, Esq.; Juan Carlos A. Marquez, Esq.

(57) ABSTRACT

A method of providing an interpretation service, is disclosed. The method includes the steps of receiving an incoming telephone call from a user, forming a plurality of databases, wherein the plurality of databases includes at least one sentence registered to individual user, receiving at least one user information item via the incoming telephone call, searching at least one of the plurality of databases for at least one sentence correspondent to the at least one information item, outputting, according the step of searching, a translation, from at least one of the plurality of databases, of the at least one sentence correspondent to the at least one information item, and outputting, in audio on the incoming telephone call, the translation of the at least one sentence correspondent to the at least one information item.

16 Claims, 11 Drawing Sheets

U.S. PATENT DOCUMENTS

| | | | |
|---|---|---|---|
| 6,085,162 A | 7/2000 | Cherny | |
| 6,134,549 A | 10/2000 | Regnier et al. | |
| 6,154,720 A * | 11/2000 | Onishi et al. | 704/2 |
| 6,161,082 A | 12/2000 | Goldberg et al. | |
| 6,243,669 B1 | 6/2001 | Horiguchi et al. | |
| 6,266,642 B1 | 7/2001 | Franz et al. | |
| 6,330,530 B1 | 12/2001 | Horiguchi et al. | |
| 6,336,114 B1 | 1/2002 | Garrison | |
| 6,356,865 B1 * | 3/2002 | Franz et al. | 704/2 |
| 6,374,224 B1 | 4/2002 | Horiguchi et al. | |
| 6,438,524 B1 | 8/2002 | Shi | |
| 6,606,596 B1 * | 8/2003 | Zirngibl et al. | 704/270 |
| 6,789,093 B2 * | 9/2004 | Obuchi et al. | 707/104.1 |
| 6,792,086 B1 * | 9/2004 | Saylor et al. | 379/88.17 |
| 6,857,022 B1 * | 2/2005 | Scanlan | 709/229 |
| 2002/0010590 A1 | 1/2002 | Lee | |

FOREIGN PATENT DOCUMENTS

| | | |
|---|---|---|
| JP | 07-222248 | 2/1994 |
| JP | 09-065424 | 8/1995 |
| JP | 2000-194700 | 12/1998 |

* cited by examiner

| USER | INSIDE OF SERVER | RESPONSE |
|---|---|---|
| CALL UP | AUTOMATICALLY DETECT THE USER USING NOTIFICATION OF CALLER ID | 「通訳サービスです。日本語をどうぞ」 |
|  | LOAD BASIC SENTENCES AND START THE RECOGNITION |  |
| 「WATASHI NO NAMAE HA SUZUKI ICHIRO DESU」 | RECOGNIZE THE SPEECH AND REPEAT THE RESULT | 「WATASHI NO NAMAE HA SUZUKI ICHIRO DESU」 |
| PUSH BUTTON 1 | DETECT PB SOUND AND PLAY BACK THE TRANSLATION | "My name is Ichiro Suzuki" |
| PUSH BUTTON 2 | DETECT PB SOUND AND START THE RECOGNITION |  |
| 「BYOUIN NO KAIWA」 | RECOGNIZE THE SPEECH | 「BYOUIN DE TSUKAU BUN WO DOUZO」 |
|  | LOAD CONVERSATION IN A HOSPITAL AND START THE RECOGNITION |  |
| 「WATASHI HA KOUKETSUATSU-SHOU DESU」 | RECOGNIZE THE SPEECH | 「WATASHI HA KOUKETSUATSU-SHOU DESU」 |
| PUSH BUTTON 1 | DETECT PB SOUND AND START THE RECOGNITION | "I have high blood presuure" |
|  | ⋮ |  |

FIG. 3

```
ID : 100
Name : 鈴木一郎
Phone : 090-1234-5678
Password : abcd1234
```

BASIC SENTENCES
 こんにちは。 Hello.
 ありがとう。 Thank you.
 私の名前は鈴木一郎です。 My name is Ichiro Suzuki.
 ヒルトンに泊まっています。 I'm staying in Hilton.
 いくらですか。 How much ?
 これは何ですか。 What is this ?
病院の会話
 熱があります。 I have a fever.
 おなかが痛いです。 I have a stomachache.
 私は高血圧症です。 I have high blood pressure.
買物の会話
 現金で払います。 I'll pay in cash
 ヒルトンに届けて下さい。 Deliver it to Hilton, Please.

AN EXAMPLE OF ADDITION ~502

To : touroku@xxx
From : suzuki-ichiro@yyy
Subject : APPEND password : abcd1234
私の名前は鈴木一郎です。(BASIC SENTENCE)
私は高血圧症です。(CONVERSATION IN A HOSPITAL)

AN EXAMPLE OF DELETION ~504

To : touroku@xxx
From : suzuki-ichiro@yyy
Subject : DELETE password : abcd1234
喫煙席をお願いします。 (BASIC SENTENCE)
妊娠しています。 (CONVERSATION IN A HOSPITAL)

AN EXAMPLE OF CHANGE ~506

To : touroku@xxx
From : suzuki-ichiro@yyy
Subject : MOVE password : abcd1234
私は高血圧症です。(CONVERSATION IN A HOSPITAL → BASIC SENTENCE)

METHOD AND APPARATUS FOR LANGUAGE TRANSLATION USING REGISTERED DATABASES

CROSS REFERERANCE TO RELATED APPLICATION

This application is a Continuation application of U.S. application Ser. No. 09/811,560 filed on Mar. 20, 2001 now U.S. Pat. No. 6,789,093. Priority is claimed based on U.S. application Ser. No. 09/811,560 filed on Mar. 20, 2001, which claims priority to Japanese Patent Application No. 2000-321920 filed on Oct. 17, 2000.

REFERENCE TO FOREIGN PRIORITY APPLICATION

This application claims priority to Japanese Patent Application No. P2000-321920.

BACKGROUND OF THE INVENTION

1. Field of the Invention

The present invention relates to interpretation services, and, more particularly, to a method and an apparatus for interpretation service enabling speech inputted by a user of a telephone to be converted into a foreign language and outputted in the translated form.

2. Description of the Related Art

Persons travelling abroad, or otherwise in need of an oral interpretation service, are often in need of an immediate response to speech in a face-to-face situation. However, in interpretation systems using optional speech recognition, the absence of limitations on the content of the speech, meaning the absence of limitations on the acceptable words to be spoken, often gives rise to extremely frequent errors in recognition, which hampers prompt and/or correct responses. Furthermore, when the speech is to be translated from any input language into a foreign language, mistranslation is also frequent.

For a speech input system involving a closed universe of interpretation, meaning that the required contents of the speech are known in advance, techniques are available that recognize typical expressions with high accuracy, due to the limited universe of words necessary for inclusion in the knowledge base. This limited universe leads to a increase in the predictability of the contents of the speech, and a correspondent increase in the accuracy of speech recognition. Where a closed universe recognition technique for typical spoken sentences limited to particular contents is used as an interpretation service, the difficulties of incorrect recognition and/or translation will be partially solved, but a new difficulty arises in that the statement that the user needs to have translated may not registered or known, and consequently that statement cannot be effectively translated.

Japanese Patent Application No. 65424/1997 discloses one example of a speech interpretation system using a speech recognition server and a radio mobile terminal. This speech interpretation system recognizes speech input through a telephone, converts it into a foreign language and outputs it in the translated form by using an optional speech recognition technique with no limitation on the contents of speech. However, this technique is subject to the same limitations discussed hereinabove.

Therefore, the need exists for an interpretation service that allows the user access to a plurality of translatable phrases, thereby increasing the probability that the statement will be recognized by the interpretation service, while increasing the likelihood that a particular phrase necessary to the user will be found in the universe of translatable phrases.

SUMMARY OF THE INVENTION

The present invention is directed to a method of providing an interpretation service. The method includes the steps of receiving an incoming telephone call from a user, forming a plurality of databases, wherein the plurality of databases includes at least one sentence registered to individual user, receiving at least one user information item via the incoming telephone call, searching at least one of the plurality of databases for at least one sentence correspondent to the at least one information item, outputting, according the step of searching, a translation, from at least one of the plurality of databases, of the at least one sentence correspondent to the at least one information item, and outputting, in audio on the incoming telephone call, the translation of the at least one sentence correspondent to the at least one information item.

The method may additionally include the steps of registering the user to access at least one of the at least one sentences registered to individual user database, and authorizing the user to access the at least one sentences registered to individual user database correspondent to that user. This authorization may be performed by identifying the user by a telephone number on caller identification, a telephone push button username, a username spoken by the user, a telephone push button password, or a password spoken by the user, for example.

The method may additionally include the steps of receiving a registered sentence manipulation command from the user, and manipulating the at least one sentence registered to the individual user, according to the registered sentence manipulation command from the user. This receiving may be via an email, a browser connection, or the incoming telephone call. The manipulating may include adding a new sentence to the at least one sentences registered to individual user database correspondent to the user, deleting a sentence from the at least one sentences registered to individual user database correspondent to the user, or editing a sentence in the at least one sentences registered to individual user database correspondent to the user. The manipulated sentence may then be registered into that user's database. Alternatively, prior to registration, a foreign language translation of the manipulated sentence may be outputted, and the user may approve or disapprove the translation. If the user disapproves, the manipulated sentence may be sent to a human translator.

The present invention is also directed to an interpretation service. The invention service includes an interpreter and a registration service. The user may call the interpreter via telephone, and receive a translation of an input sentence. The registration service includes a private information manager that receives an incoming telephone call from a user, wherein the private information manager manages a plurality of databases, wherein the plurality of databases includes at least one database of sentences registered to the individual user. An authentication server preferably identifies the user as a user authorized to access at last one of the registered sentence databases. The registration service receives at least one user information item via the incoming telephone call, and searches at least one of the plurality of databases for at least one sentence correspondent to the at least one information item. The registration service outputs a translation, from at least one of the plurality of databases, the at least one sentence correspondent to the at least one information item, in audio on the incoming telephone call.

The interpretation service may additionally include, among the plurality of databases, a public sentence database, and an additionally registered sentence database. The additional sentence database is preferably accessed through the private information management server via voice, email, or intra/internet, and the additional sentences include new, edited, or deleted sentences for inclusion in the database of registered sentences.

The present invention provides an interpretation service, including a registration service, to access, via telephone, internet, and the like, to create and edit a collection of sentence examples available to that user for translation. This enables the user not only to rely on the interpretation service for a sentence translation, but also ensures an accurate and prompt response while increasing the probability that the statement will be recognized by the interpretation service. Further, using the organization of the present invention, the likelihood is increased that a particular phrase necessary to the user will be found in the universe of translatable phrases.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical interpretation service. Those of ordinary skill in the art will recognize that other elements are desirable and/or required in order to implement the present invention. However, because such elements are well known in the art, and because they do not facilitate a better understanding of the present invention, a discussion of such elements is not provided herein. Although the embodiments presented hereinbelow concern translation of an input in Japanese into an output in English, it will be apparent to those skilled in the art that the invention can be effectively implemented for virtually any input and/or output language. Thus, although the Japanese characters used throughout may not be directly translatable, either to a pronunciation using Arabic letters or to an English phrase, the Japanese to English system disclosed herein is exemplary only, and it will be apparent to those skilled in the art the necessary variations necessary for languages in which no direct translation is available.

Figure 1:
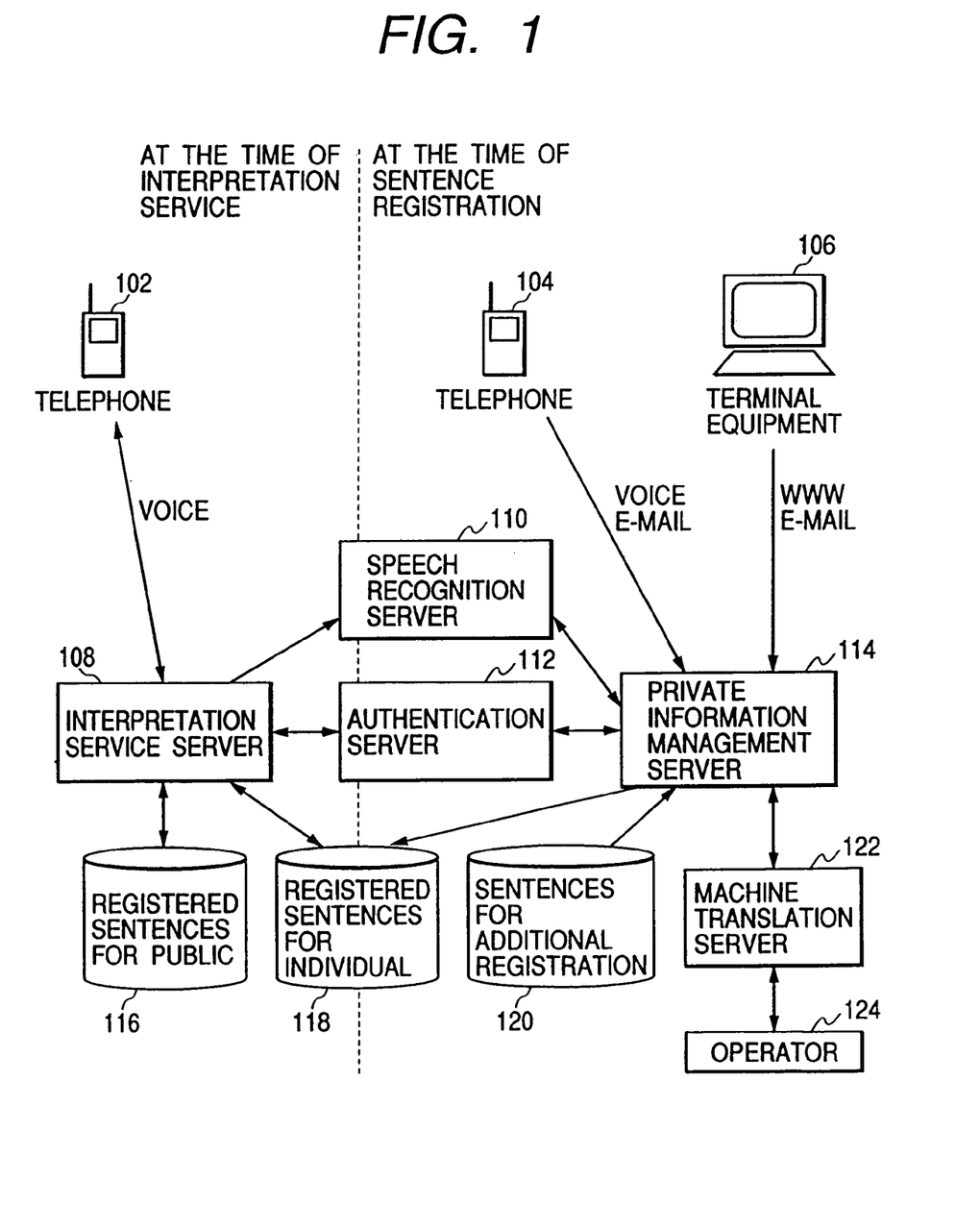
FIG. 1 is a block diagram illustrating one embodiment of a telephone-based interpretation and sentence registration service method, and an interpretation and sentence registration service apparatus.

FIG. 1 is a block diagram illustrating one embodiment of a telephone-based interpretation and sentence registration service method, and an interpretation and sentence registration service apparatus. The interpretation service is illustrated to the left of the dotted line in FIG. 1, and is preferably accessed via a telephone, and, more specifically, via a cellular or other portable telephone 102. In the interpretation service, the user calls an interpretation service server 108 from the telephone set 102. The interpretation service server identifies the user using an authentication server 112, and extracts registered sentences for the user from a database of registered sentences for individual users 118. An input in the user's voice is then recognized by a speech recognition server 110, translated into a foreign language matching the contents of the input, and outputted in the translated format. The user may instruct the service to use a particular collection of registered sentences for the exclusive use of that user. If the authentication server gives a response that the user is not registered, or if the user does not have access to any exclusive use registered sentences, a plurality of registered sentences designated for use by the public 116 are accessed. Public sentences may additionally be available to users also having registered sentences, and those users having registered sentences may select which of the public sentences are available for use by that registered user, although it will be apparent to those skilled in the art that the total number of sentences available to each user should be kept relatively small, such as less than 100 sentences total, in order to avoid the translation difficulties discussed hereinabove.

To the right of the dotted line, FIG. 1 illustrates the sentence registration system. In order to register a sentence, a terminal 106 is used to access the sentence registration system. As used herein, a terminal includes a personal computer, personal digital assistant, and a telephone set 104, for example. The user accesses a private information manager 114, which may be, for example, a server, from the terminal via telephonic, voice over IP, email, internet, or internet, for example, preferably in the voice of the user.

The private information manager 114, using an authentication server 112, preferably identifies the user, such as by voice pattern or password, and accesses registered sentences matching that user from the database of registered sentences for individuals 118, which may be a database or server, for example. The private information manager 114 may be used to add, alter, delete, or otherwise process a sentence or sentences into, within, or from, the collection of registered sentences for the individual accessing the registered sentence database 118. A new sentence or sentences may be composed, or an existing sentence may be selected from the sentences for additional registration 120, which sentences for additional registration are preferably prepared in advance, such as by the system provider or manager. Additionally, because it is necessary to translate these additional sentences into a foreign language, these sentences for additional registration preferably have respective foreign language versions entered in advance. Alternatively, the additional sentence may be transferred to the automated translation server 122 for translation into a foreign language. Alternatively, if the additional sentence is substantially non-translatable by the automated translation server, the additional sentence may be transferred to an operator 124 for non-automated translation. Further, when the user registers an additional sentence from the terminal, manipulation and/or translation of the additional sentence may be performed via the speech recognition server 110.

Figure 2:
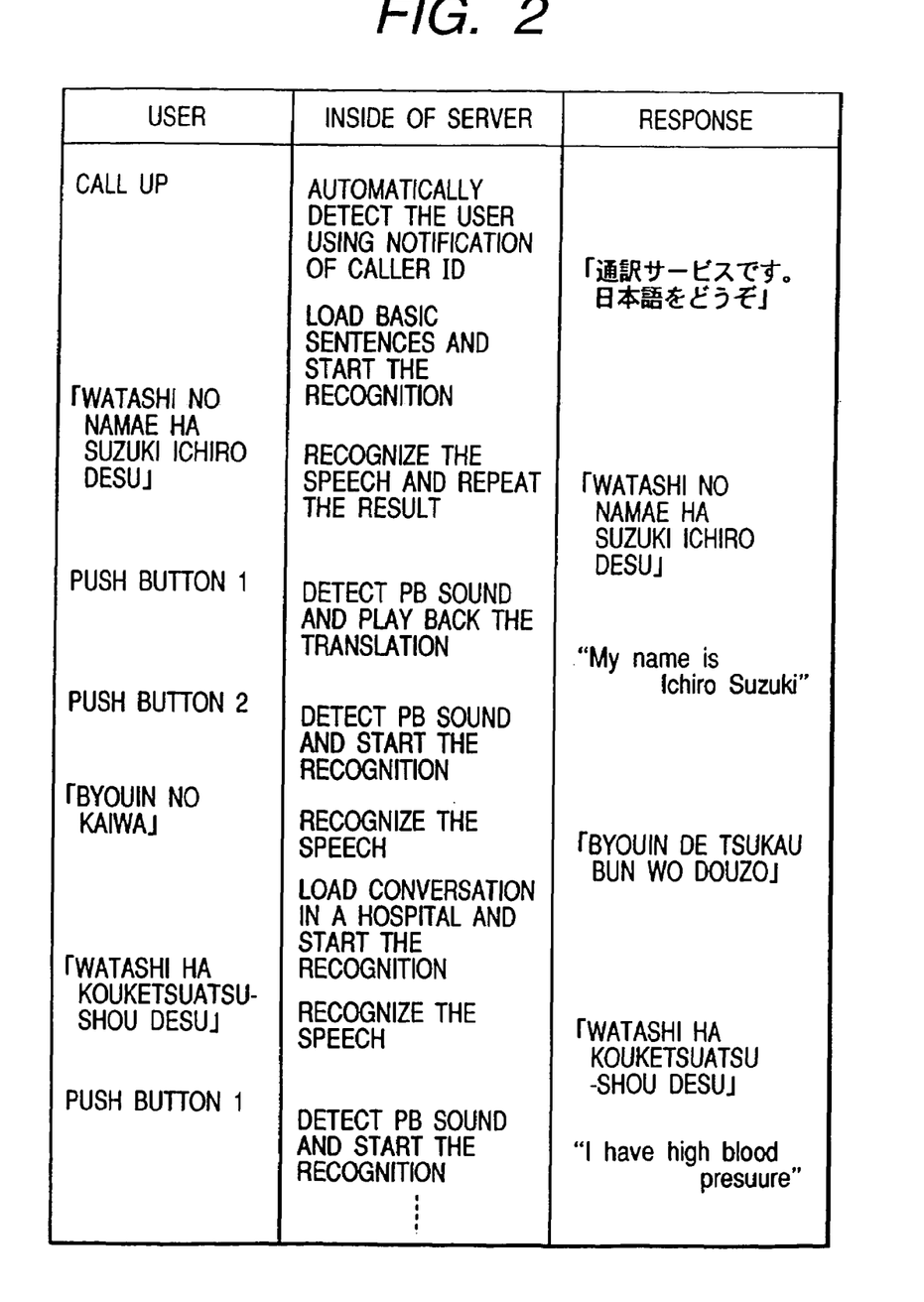
FIG. 2 is a graphical table illustrating the flow of actions the user would perform when using an interpretation service.

FIG. 2 is a graphical table illustrating the flow of actions the user would perform when using an interpretation service according to the present invention. First, the user dials the telephone number of the interpretation service. The authentication server, utilizing, for example, a notification of caller ID function, a password, such as by ID and password entry via push-button, or speech recognition, identifies the user. Once the user is identified, in an embodiment wherein the user speaks Japanese, the authentication server may respond, for example, "Tsuyaku sabisu desu. Nihongo de dozo", which, in English, translates as "This is the interpretation service. Go ahead in Japanese, please", and the basic sentences are loaded from the collection of registered sentences for the individual for that particular user, and speech recognition for those registered sentences is begun.

If, for example, the user responds, in Japanese, "Watashi no namae wa Suzuki Ichiro desu", which, in English, translates as "My name is Ichiro Suzuki", the server performs speech recognition of the user's response, and preferably repeats the recognition result to the user. The user, if the repeated speech is correct, alerts the server to the correct recognition, such as by pressing a key or keys on the terminal, such as #1, for example, to thereby instruct translation and playback of the translated speech. The server recognizes the translation instruction, such as by recognition of the push button sound for #1, and plays back the English version of the recognized sentence. In a preferred embodiment, the user may repeat the reproduced sound as often as required or desired, such as by pressing the button #1 repeatedly in order to, with each press, instruct repeated playback. When the user approves the result, the user may exit the system, such as by pressing an exit key or keys, or may input the next sentence, such as by pressing a button #2, for example.

The user may, for example, desire to enter sentences for use in a hospital, instead of other basic registered sentences. In such a circumstance, the user may voice a command phrase instructing a change in use-type, such as by speaking aloud "Conversation in a hospital." Alternatively, the change in use-type may be entered by, for example, telephone push-button. Where the user is Japanese, the server recognizes the change in use-type command, and preferably responds, for example, "Byoin de tsukau bun o dozo", which translates in English as "Sentences for use in a hospital are ready for you", and substantially simultaneously the system loads the sentences for use in a hospital from the user's collection of registered sentences for the individual. The system then begins speech recognition of these sentences, as discussed hereinabove.

In an exemplary hospital use-type, as in the case of the basic sentences, the server recognizes speech input, such as "Watashi wa koketsuatsusho desu", which translates in English as "I have high blood pressure", repeats the speech input, and, in response to, for example, a push-button input, outputs the English translation.

Figure 3:
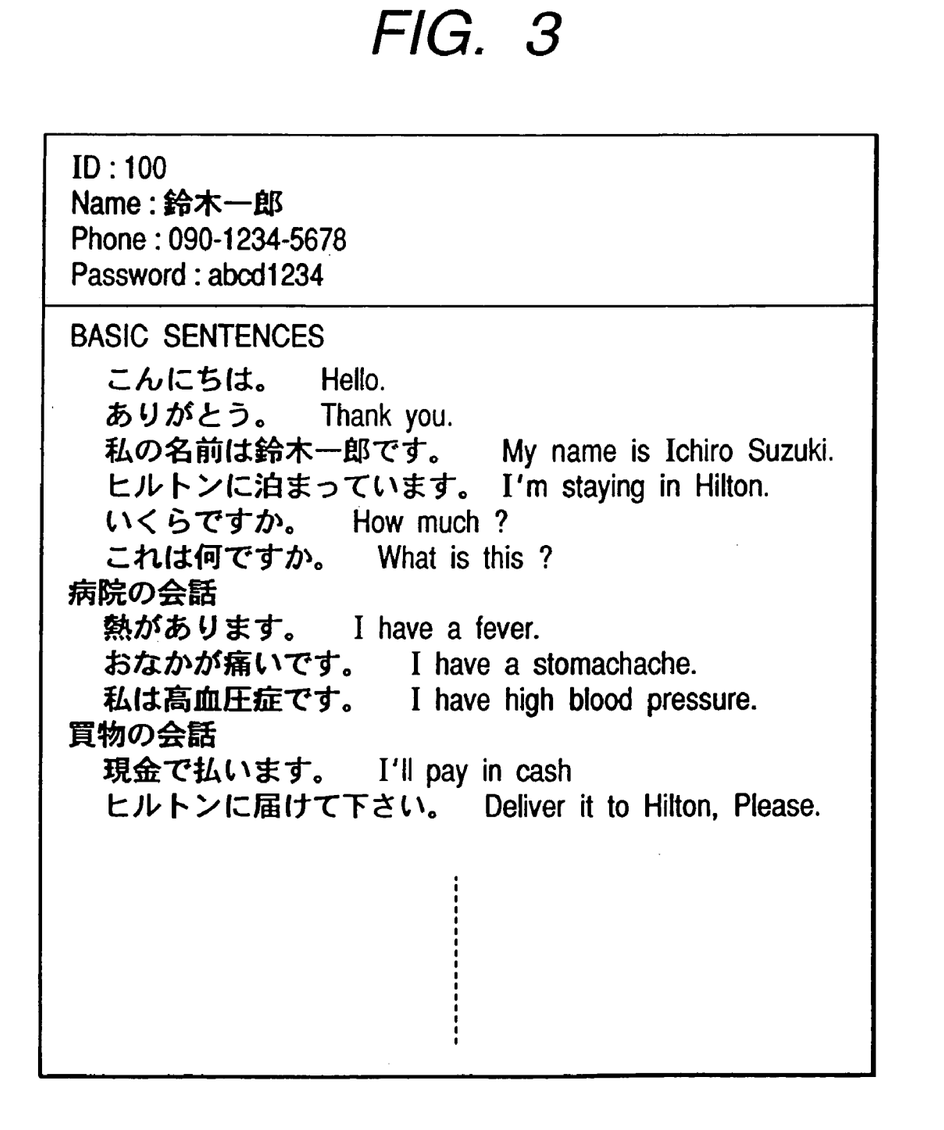
FIG. 3 is a graphical table illustrating exemplary contents in a collection of registered sentences for individual.

FIG. 3 is a graphical table illustrating exemplary contents in a collection of registered sentences for individual. Private information items that identify the user, such as the ID, name, telephone number and password of that user, are preferably appended to the collection of registered sentences for that individual. It will be apparent to those skilled in the art that these private information items may alternatively be managed by a different server. The registered sentences are additionally included. As described hereinabove with respect to FIG. 2, the registered sentences may be classified according to a use-type. The exemplary embodiment shown in FIG. 3 includes a conversation in a hospital setting, and a conversation in a retail shopping setting, in addition to basic sentences. Although use-types may be set according to the system, the user may add a new use-types, or delete use-types, as necessary.

Figure 4:
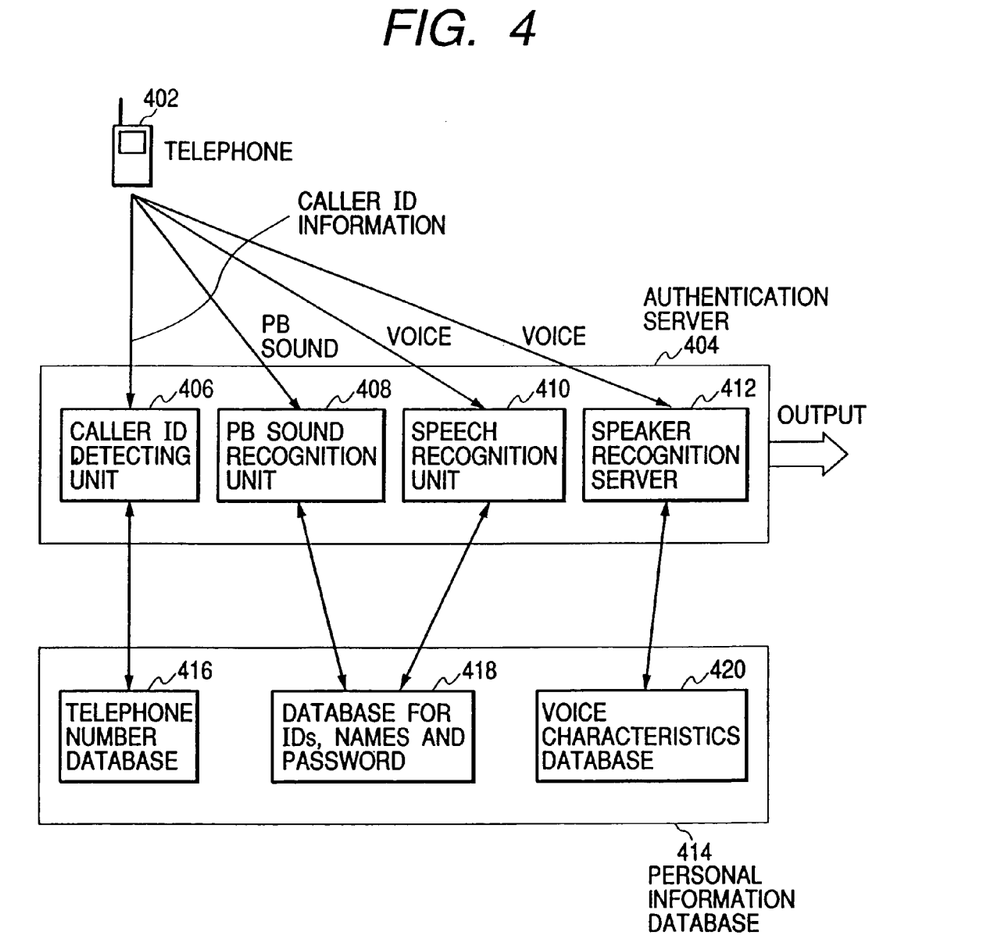
FIG. 4 is a block diagram illustrating an exemplary configuration of the authentication server.

FIG. 4 is a block diagram illustrating an exemplary configuration of the authentication server. Data serving as the basis of authentication may include, for example, a telephone number 416, ID number, name, password 418, and/or voice characteristic 420. Thus, simple personal characteristics or data may be used to identify a user via existing telephone, voice, and/or internet technology. It will be apparent to those skilled in the art that more sophisticated data processing mechanisms, such biological recognition data in the form of a finger print and/or eye scan, may also be used with the resent invention. In an embodiment wherein a telephone number is used, caller ID information sent from a telephone 402 may be detected by a caller ID detecting unit 406, and collated with an authentication database to identify the user. In an embodiment wherein an ID number, name, and/or password is used, a telephone PB sound generated by push-button operation on the telephone set is recognized by a PB sound recognition unit 408, and collated with the authentication database. A user may additionally enter the name or password by speaking, or by keyboard, and collate the recognition result by a speech recognition unit 410 with the authentication database. In an embodiment wherein voice characteristics 420, such as voice print, form the basis of identification, recognition may additionally be accomplished via a speaker recognition unit 412.

Figure 5:
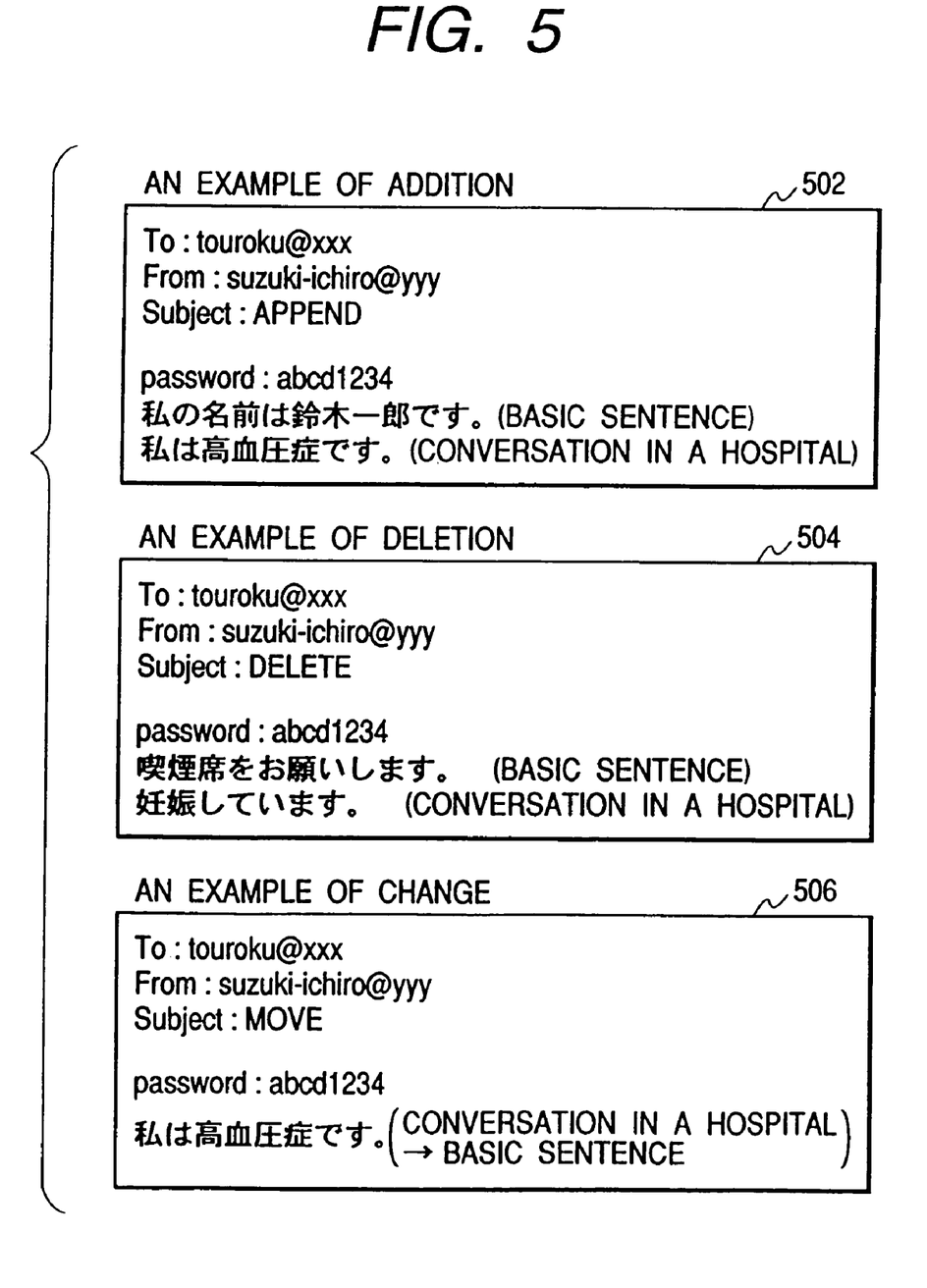
FIG. 5 is a flow table illustrating an exemplary embodiment of sentence contents registered via e-mail.

FIG. 5 is a flow table illustrating an exemplary embodiment of sentence contents registered via e-mail. In an embodiment wherein sentences are registered via e-mail, in addition to registering an e-mail address for a given user, rules regarding the formatting of e-mail are preferably determined in advance, and registration is then performed by sending from the user of an e-mail conforming with the rules applicable to the designated address. Additionally, the entry of a user's password ma be required in order to prevent alteration by an unauthorized third-party.

Sentences may be added to the registered sentence via email, as shown at step 502. As step 502, the registration is indicated to be an addition via an instruction to the system, such as with the instruction within the subject line "APPEND", and the contents and applicable use-type are then entered into the registered sentence database. Use-type may not be included, and such non-specified sentences as to use-type may, for example, be included in the basic sentence use-type. Further, the inclusion of a password in the email is dependent of the settings for the receiving server for that email. Step 504 is an example of deletion, and, in the example, the contents and applicable use-type of the sentence are entered. In an embodiment wherein no use-type is entered, different rules may be applied, such as deletion of all sentences that meet predetermined criteria, such as a certain percentage of matched words with the requested deletion. Step 504 is an example of a change 506, such as the change of a sentence or of a use-type. In an embodiment wherein a command sentence is used to instruct a change, a class of "commands" may be included, such as options for use-type selection, and this class may be changed, augmented or cleared of unnecessary command sentences.

Figure 6:
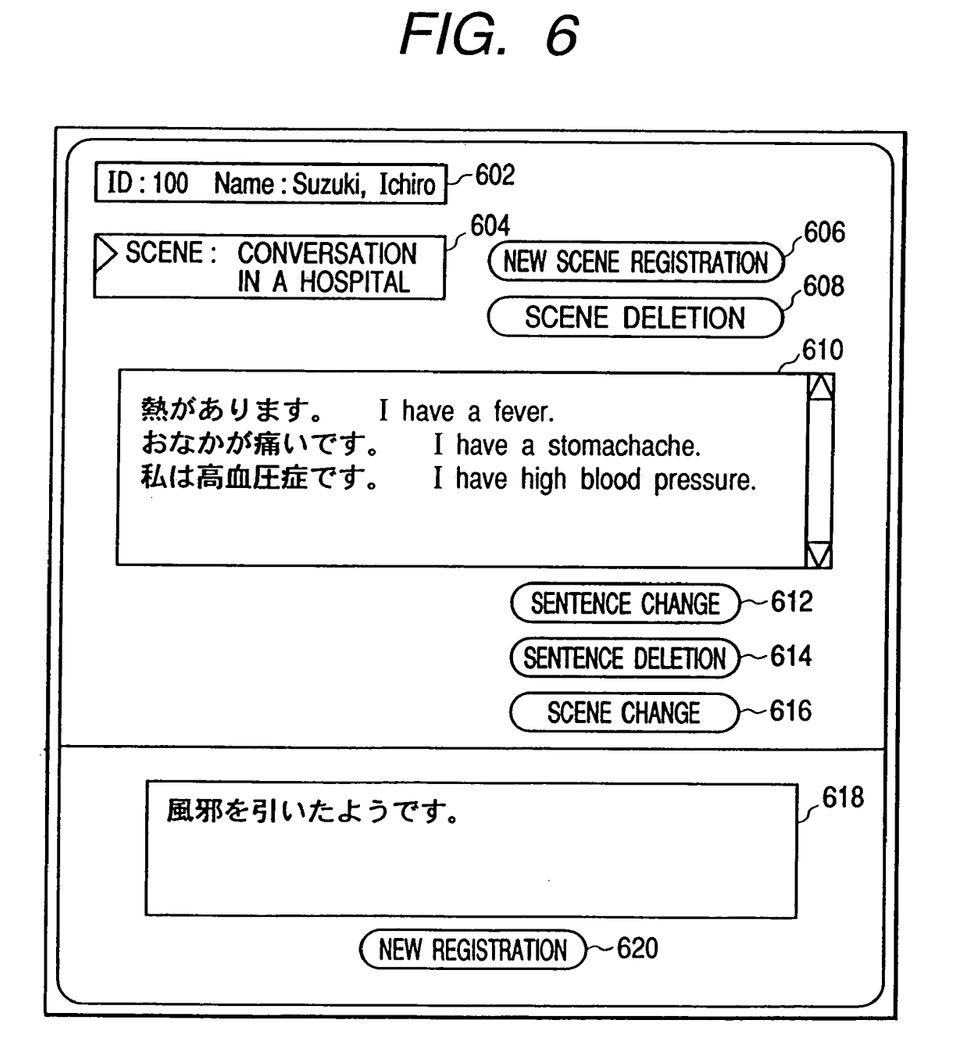
FIG. 6 is a screen shot illustrating an exemplary embodiment of sentence registration using the WWW.

FIG. 6 is a screen shot illustrating an exemplary embodiment of sentence registration using the WWW. The user logs into an individual account, and the illustrated screen is then preferably displayed. In a private information display box 602, the user's ID, name, or the like, is displayed. In a use-type selection/display box 604, the name of the use-type to be edited may be displayed. The use-type may be made selectable by providing the use-type box 604 as a pull-down menu, for example. The screen may additionally include a new use-type registration button 606, a use-type deletion button 608, and additional buttons that make possible registration or deletion of a use-type or types. In a sentence display box 610, sentences involved in a selected use-type may be displayed. If a sentence is to be changed or deleted, the sentence may be selected using a mouse or the like, followed by the pressing of a sentence change button 612, or a sentence deletion button 614. The use-type may be changed using a use-type change button 616. Further, wherein a new sentence is to be registered, the new sentence may be inputted to a new sentence input box 618, and a new registration button 620 may be pressed in order to execute the registration.

Figure 7:
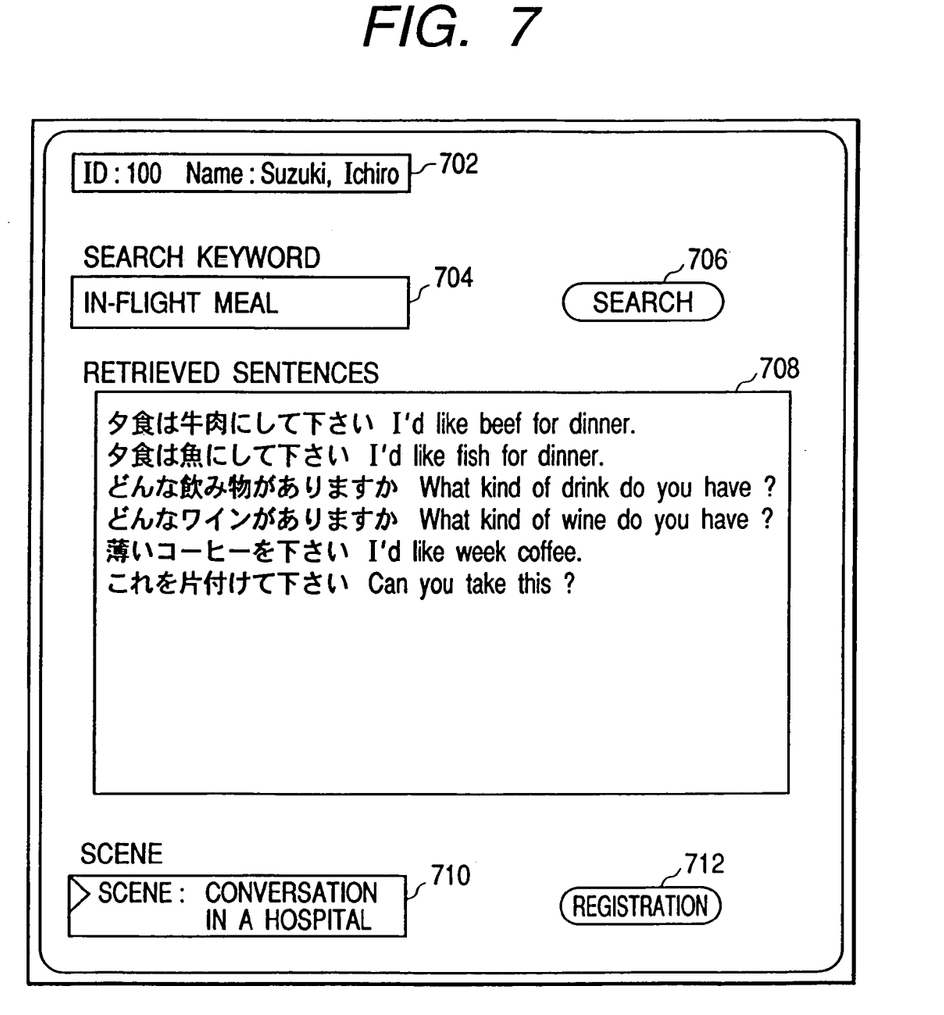
FIG. 7 is a screen shot illustrating an additional exemplary embodiment of sentence registration using the WWW.

FIG. 7 is a screen shot illustrating an additional exemplary embodiment of sentence registration using the WWW. The user, instead of entering a sentence, enters a keyword into the keyword input box 704. When the user presses a search button 704, a sentence or sentences associated with the entered keyword are displayed in a sentence display box 708 from a secondary sentence database stored in the server. The secondary sentence database stored in the server in FIG. 7 is different from the registered sentences readied for the speech interpretation service, and preferably includes a substantially greater number of sentences than the number in the collection of registered sentences for the speech interpretation service. This is due to the fact that, while use for the speech interpretation service requires a high speech recognition rate, and therefore fewer sentences to access and understand, the secondary database searches using strings of characters, and consequently may quickly review larger numbers of sentences, such as a several thousand to a several hundreds of thousands of sentences. Further, because this much greater number of sentences is present in the secondary database, both as native language sentences and translated sentences, accurate translations can be presented quickly. When sentences are displayed according to character string searches, the user can preferably register the displayed sentences from the secondary database into the collection of registered sentences by selecting desired additional sentences and pressing a registration button 712. Use-type matching of sentences from the secondary database may also be performed by activating, for example, a scene selection/display box 710.

Figure 8:
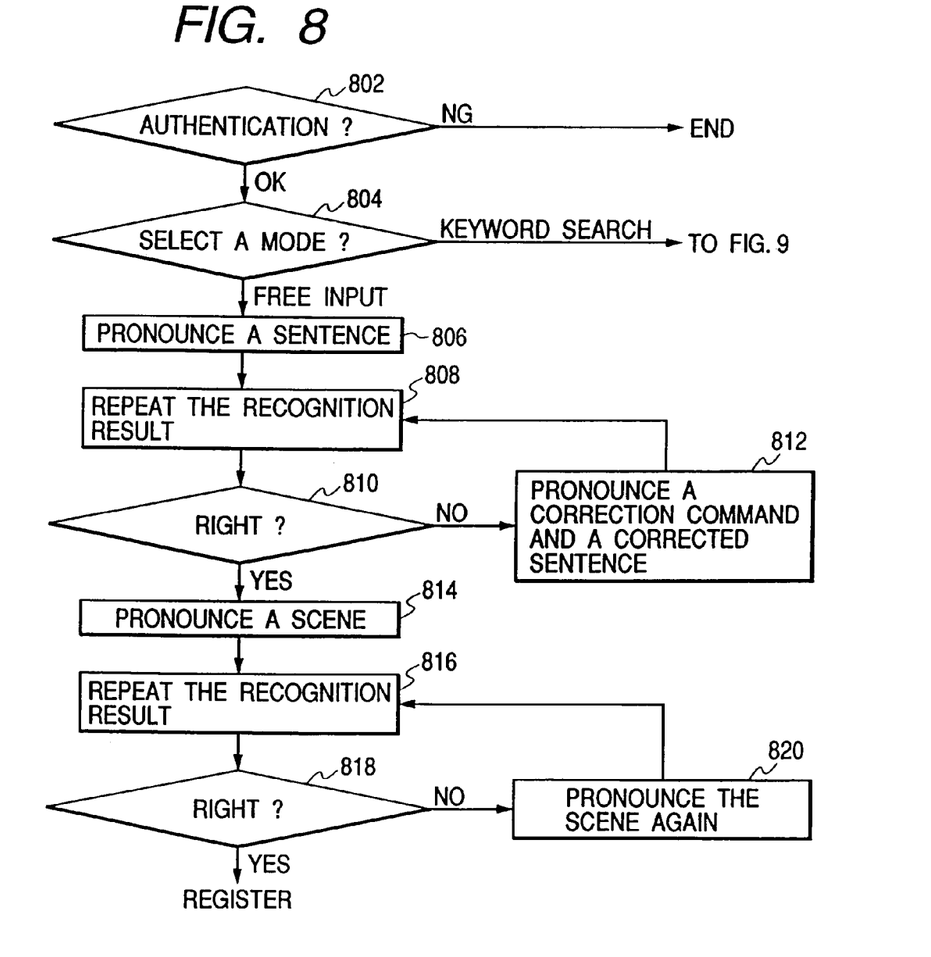
FIG. 8 is a flow diagram illustrating the use of a human voice over a telephone for sentence registration.

FIG. 8 is a flow diagram illustrating the use of a human voice over a telephone for sentence registration. A telephone call emanates from the user, and the server attempts authentication 802 using the methodology described hereinabove with reference to FIG. 4. If the authentication is successfully accomplished, mode selection 804 may be performed. The method may then follow a free input formula, as in FIG. 8, or a keyword search formula, as discussed hereinbelow with respect to FIG. 9. For mode selection, A human voice or a PB sound may be used.

Returning now to the free input formula of FIG. 8, the sentence desired to be registered next is pronounced 806. The server recognizes this speech, and repeats the recognition result 808. The speech recognition at step 808, unlike the sentence recognition used by the speech interpretation service discussed hereinabove with respect to FIG. 1, is a sentence recognition that accepts linking of words in any pattern. Although the recognition rate of the optional sentence recognition at step 808 is low, and correct recognition is seldom achieved on the first attempt, a correct recognition may be achieved in a simple manner. The user listens to the result of speech recognition repeated, and judges the correctness 810. If the recognition is not correct, the user speaks a correction command and a corrected sentence 812. The correction command and corrected sentence may be spoken or entered in a variety of ways, such as the pronunciation of the incorrect portion of the sentence again, or by the pronunciation of a corrected sentence portion immediately following a repetition of the incorrect portion. Each time a correction is made, the server preferably repeats the updated result of the recognition, and the cycle is repeated until the correct recognition result is obtained. Once the sentence is correct, then a us-type is pronounced 814, the result of the recognition is repeated 816, the user judges whether the recognition is correct 818, the recognition, if incorrect, is corrected by re-pronunciation 820, and the sequence is repeated until the correct use-type is obtained. When the correct sentence and the use-type are obtained, the sentence is registered as one of the registered sentences for that individual.

Figure 9:
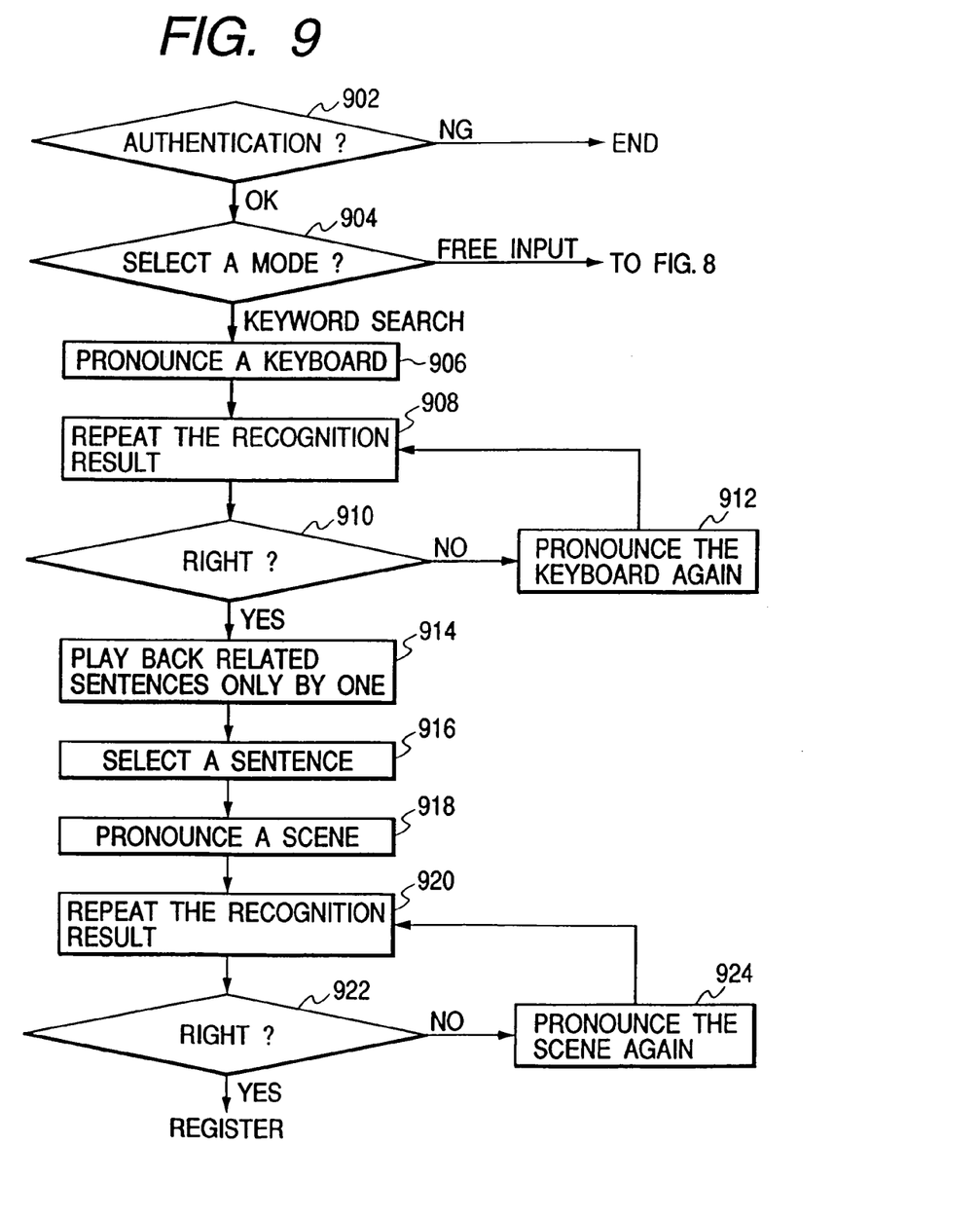
FIG. 9 is a flow diagram illustrating an exemplary embodiment of sentence registration using the human voice over a telephone.

FIG. 9 is a flow diagram illustrating an exemplary embodiment of sentence registration using the human voice over a telephone. If a keyword search is selected at a mode selection step 904, the user pronounces a keyword 906. The server recognizes this speech, and repeats the recognition result 908. Preferably, in this embodiment, the speech recognition is an isolated word recognition based on a word, rather than on a sentence. The user listens to the result of the speech recognition, and judges whether it is correct 910. If the recognition is not correct, the user pronounces the keyword again 912, and the above methodology is repeated until a correct recognition result is obtained. Alternatively, by entering a request, such as by pressing a button or the like, the user may successively play back second, third and subsequent candidates for the speech recognition result, and select the correct word inputted when that correct word is played back. Once the correct keyword is obtained, the server may successively reproduce sentences associated with this keyword 914. A database such as that discussed hereinabove with respect to FIG. 7 may be used for the generation of the keyword and the successive sentences. The user selects, such as by push-button operation or the like, the desired sentence 916 from the successive sentences, and then enters a use-type as discussed hereinabove with respect to FIG. 8.

Figure 10:
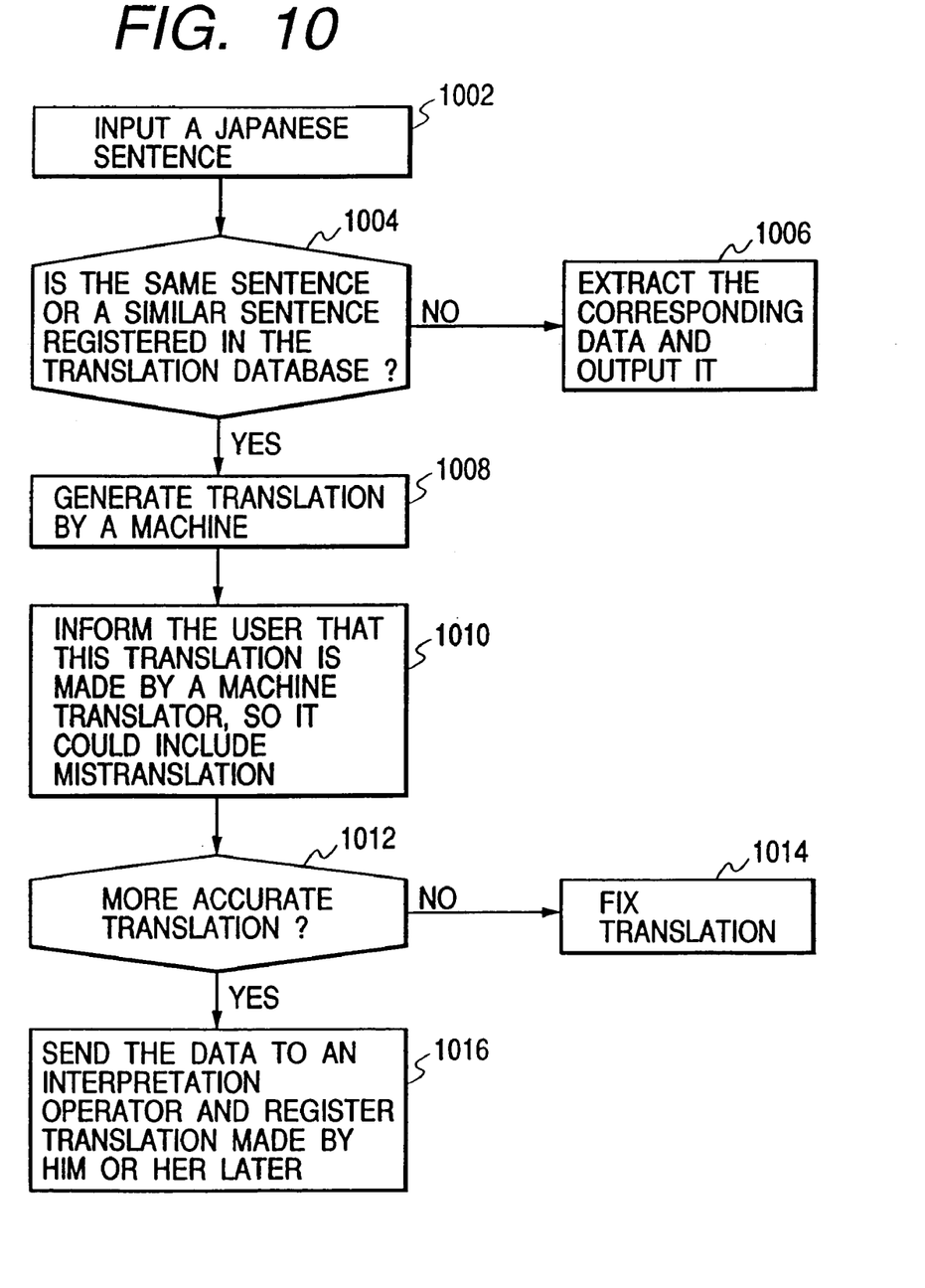
FIG. 10 is a flow diagram illustrating the preparation of a translation of a sentence desired to be registered.

FIG. 10 is a flow diagram illustrating the preparation of a translation of a sentence desired to be registered. Once the user enters a sentence in a first language, such as Japanese, via the methodology described hereinabove with respect to FIGS. 5 through 9 1002, the entered sentence is checked against the bilingual database the server is equipped with 1004, in order to determine whether the sentence is the same, or similar to, a sentence included in the bilingual database. Generally, the sentence database used in FIGS. 7 through 9, and the bilingual database used in FIG. 10, are managed together, and, thus, if each sentence in the bilingual database of FIG. 10 is provided with a translation and stored bilingually, a translation will become available for each sentence registered in accordance with FIGS. 7 through 9. Additionally, for a sentence resulting from a simple replacement of one word or a few words in another sentence included in the database, a translation may be simplistically prepared by replacing just the corresponding word or words. In an embodiment wherein a simple replacement sentence is involved, the corresponding data is extracted and outputted as a translated sentence 1006. If neither the same sentence nor a similar one is found in the bilingual database, a translation may be prepared using the machine translation system 1008. When a translation prepared by he machine service is to be registered into the collection of registered sentences for the individual, the system preferably notifies the user, for example, that "This translation has been made by a machine translator, an consequently may include mistranslation" 1010. The user may then either approve the machine translated sentence, and risk some inaccuracy, or the user may demand a more accurate translation 1012. In a preferred embodiment, there are additional costs to the user associated with a demand for a more accurate translation. If the user answers "I need no more accurate translation", the translation made by the machine translator is fixed 1014, and registered among the registered sentences. If the user answers "I need a more accurate translation", the sentence may be sent to a human interpretation operator for translation by a human translator, and then subsequently registered 1016.

Figure 11:
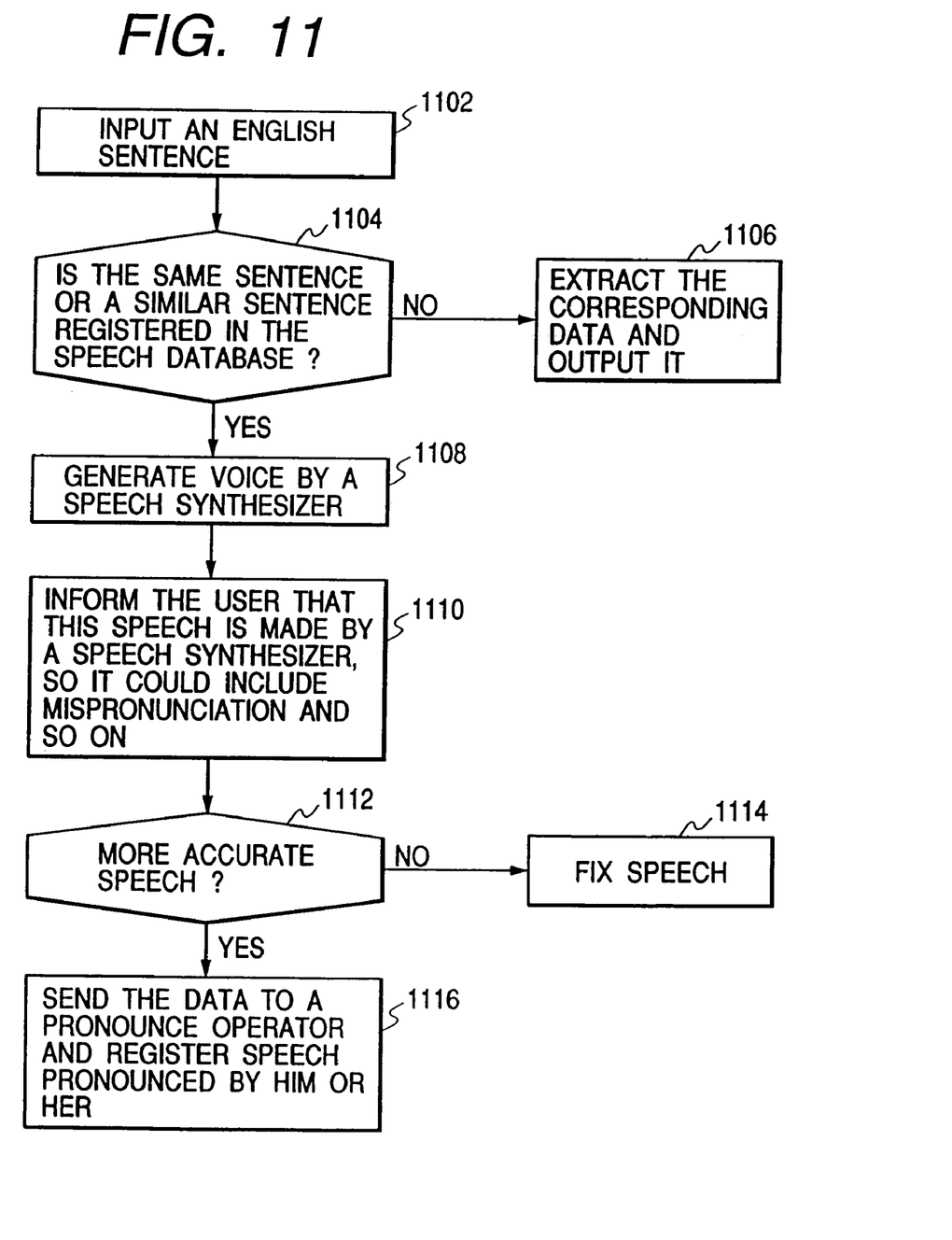
FIG. 11 is a flow diagram illustrating the generation of an oral output for a sentence desired to be registered.

FIG. 11 is a flow diagram illustrating the generation of an oral output for a sentence desired to be registered. Generation of an oral output is accomplished within substantially the same framework as that referred to with respect to FIG. 10. Thus, when an English sentence is entered 1102, for example, the speech database is searched for the same sentence or a similar one 1104, and, if one is found, it is outputted as it is 1106. If the same or a similar sentence is not found, a new one is prepared by the speech synthesizer 1108, i.e. by the machine translator. If neither the same nor a similar sentence is found, an error or an unnaturalness in pronunciation, rhythm, or the like may result, and the user is notified 1110 accordingly. The user is then asked whether the user accepts the translation as it is, or whether the user desires a more accurate translation 1112. If the user accepts the translation, the translation is fixed as the oral output 1114. If the use does not accept the translation, the operator generates and registers an output of improved correctness 1116.

The present invention enhances the accuracy of speech recognition, and enables a user to access the most necessary and desirable sentence for that particular user. Furthermore, if a user desires a sentence to be translated for the first time at the point of dialogue, the user can begin to speak immediately after registering the sentence through a mobile telephone or the like. The quality of translation, and the ease of use, of the present invention is therefore a substantial improvement over prior methods. Other advantages and benefits of the present invention will be apparent to those skilled in the art.

The present invention is not limited in scope to the embodiments discussed hereinabove. Various changes and modifications will be apparent to those skilled in the art, and such changes and modifications fall within the spirit and scope of the present invention. Therefore, the present invention is to be accorded the broadest scope consistent with the detailed description, the skill in the art and the following claims.

What is claimed is:

1. A method of providing an interpretation service performed by an interpretation service server, comprising:
    receiving a telephone call from a user;
    identifying the user via an authentication server;
    extracting from at least one database at least one registered sentence uniquely registered to the user, the extracted sentence being one of sound data or text data, said database comprising at least one pair of sentences described in a first language and a second language, the sentence in the second language being a translation of the sentence in the first language or vice versa;
    receiving a voice of the user via said received telephone call;
    recognizing said received voice of said user using the at least one registered sentence extracted;
    extracting from the database a translation of the sentence used by said user; and
    outputting the extracted translation in audio on said received telephone call.

2. The method of claim 1, further comprising extracting from at least one public database at least one registered sentence registered publicly.

3. The method of claim 1, further comprising:
    detecting a telephone number from a telephone set of the user when receiving said received call; and
    identifying the user corresponding to said detected telephone number.

4. The method of claim 1, further comprising:
    receiving at least one input of private information from the user; and
    identifying the user corresponding to said at least one input of private information.

5. The method of claim 4, wherein said at least one input of private information is one of a telephone push button user name, a username spoken by said user, a telephone push button password and a password spoken by the user.

6. The method of claim 1, further comprising:
    receiving a registered sentence manipulation command from the user; and
    manipulating at least one of said at least one registered sentences uniquely registered to the user based on said registered sentence manipulation command.

7. The method of claim 6, wherein said manipulating comprises at least one action selected from the group consisting of adding at least one new sentence to said at least one database corresponding to the user, deleting a sentence from said at least one database corresponding to the user and editing said at least one registered sentence of said at least one database corresponding to the user.

8. The method of claim 7, wherein accessing said interpretation service is accomplished via at least one contact selected from the group consisting of an email, a browser connection and said received telephone call.

9. The method of claim 7, further comprising:
    displaying at least one stored sentence for additional registration before said manipulating;
    receiving a selection of said at least one stored sentence by the user; and
    manipulating said received selection of said at least one stored sentence.

10. The method of claim 1, further comprising:
    receiving a manipulation command from the user;
    manipulating at least a selection of said sentence according to said manipulation command;
    translating said manipulated sentence;
    registering said translation to the user; and
    storing said registered translation in said database.

11. The method of claim 10, wherein said manipulating command involves editing.

12. The method of claim 10, wherein said manipulating command involves adding.

13. The method of claim 10, further comprising:
    outputting said translated manipulated sentence; and
    relating to the user a degree of reliability of an accuracy of said translated manipulated sentence.

14. The method of claim 13, wherein said degree of reliability of the accuracy of said translated manipulated sentence is determined by a sentence which is at least similar to said manipulated sentence.

15. The method of claim 13, further comprising sending said manipulated sentence to a human translator when the accuracy of said translated manipulated sentence is not reliable to the user.

16. The method of claim 1, wherein the database consists of at least one registered sentence uniquely registered to the user.

* * * * *